United States Patent
Hetche (10) Patent No.: US 12,084,384 B2
(45) Date of Patent: Sep. 10, 2024

(54) RAPID-HARDENING MINERAL BINDER MIXTURE

(71) Applicant: VENATOR GERMANY GMBH, Duisburg (DE)

(72) Inventor: Olaf Hetche, Rheine (DE)

(73) Assignee: VENATOR GERMANY GMBH, Duisburg (DE)

( * ) Notice: Subject to any disclaimer, the term of this patent is extended or adjusted under 35 U.S.C. 154(b) by 187 days.

(21) Appl. No.: 17/421,020

(22) PCT Filed: Jan. 15, 2020

(86) PCT No.: PCT/EP2020/050860
§ 371 (c)(1),
(2) Date: Jul. 7, 2021

(87) PCT Pub. No.: WO2020/148309
PCT Pub. Date: Jul. 23, 2020

(65) Prior Publication Data
US 2022/0098101 A1    Mar. 31, 2022

(30) Foreign Application Priority Data

Jan. 18, 2019 (EP) .................... 19152545

(51) Int. Cl.
| | | |
|---|---|---|
| *C04B 22/12* | (2006.01) | |
| *C04B 22/14* | (2006.01) | |
| *C04B 22/16* | (2006.01) | |
| *C04B 28/06* | (2006.01) | |
| *C04B 40/00* | (2006.01) | |
| C04B 28/04 | (2006.01) | |
| C04B 103/00 | (2006.01) | |
| C04B 103/12 | (2006.01) | |
| C04B 111/00 | (2006.01) | |

(52) U.S. Cl.
CPC ............ *C04B 22/142* (2013.01); *C04B 22/12* (2013.01); *C04B 22/16* (2013.01); *C04B 28/06* (2013.01); *C04B 40/0042* (2013.01); *C04B 28/04* (2013.01); *C04B 2103/0019* (2013.01); *C04B 2103/12* (2013.01); *C04B 2111/00637* (2013.01)

(58) Field of Classification Search
CPC ....... C04B 22/142; C04B 22/12; C04B 22/16; C04B 28/06; C04B 40/0042; C04B 28/04; C04B 2103/0019; C04B 2103/12; C04B 2111/00637; C04B 22/14; C04B 40/00; C04B 22/143; C04B 22/124
See application file for complete search history.

(56) References Cited

U.S. PATENT DOCUMENTS

| | | |
|---|---|---|
| 5,961,712 A | 10/1999 | Sun et al. |
| 5,980,628 A | 11/1999 | Hjelmeland et al. |
| 6,238,474 B1 | 5/2001 | Unsin |
| 2009/0025613 A1 | 1/2009 | Testut et al. |
| 2016/0107933 A1 | 4/2016 | Schmitt et al. |
| 2018/0105466 A1 | 4/2018 | Wilde et al. |
| 2018/0334880 A1 | 11/2018 | Jones et al. |
| 2019/0144340 A1 | 5/2019 | Hesse et al. |
| 2019/0194072 A1 | 6/2019 | Esnault et al. |
| 2020/0039883 A1 | 2/2020 | Ohgi et al. |

FOREIGN PATENT DOCUMENTS

| | | | |
|---|---|---|---|
| CN | 109071351 A | 12/2018 | |
| EP | 0 579 063 A1 | 1/1994 | |
| EP | 0 858 981 A1 | 8/1998 | |
| EP | 2774902 A1 * | 9/2014 | ............. C04B 28/04 |
| EP | 3 260 258 A1 | 12/2017 | |
| JP | 2002-249351 A | 9/2002 | |
| JP | 2002249352 A * | 9/2002 | ......... C04B 40/0039 |
| JP | 2018-90428 A | 6/2018 | |
| WO | WO 97/45379 A1 | 12/1997 | |
| WO | WO 2017/155517 A1 | 9/2017 | |
| WO | WO 2018/003832 A1 | 1/2018 | |

OTHER PUBLICATIONS

JP-2002249352-A, machine translation (Year: 2002).*
Fishwick, J.H. Calcium Aluminate Cement Concrete [retrieved from the internet at Oct. 31, 2023 from <URL:https://www.concreteconstruction.net/how-to/materials/calcium-aluminate-cement-concrete_o>]. (Year: 1982).*
EP-2774902-A1, machine translation (Year: 2017).*
DIN EN 197-1:2011-11: "Cement—Part 1: Composition, specifications and conformity criteria for common cements", pp. 1-40 (2011).
DIN EN 13279-2:2014-03: "Gypsum binders and gypsum plasters—Part 2: Test methods", pp. 1-25 (2014).
DIN EN 1348:2007-11: "Adhesives for tiles—Determination of tensile adhesion strength for cementitious adhesives", pp. 1-10 (2007).

* cited by examiner

*Primary Examiner* — Anthony J Green
*Assistant Examiner* — Marites A Guino-O Uzzle
(74) *Attorney, Agent, or Firm* — Norman B. Thot (57) ABSTRACT

A fast-curing mineral binder mixture includes a titanium (IV)-based accelerator, a cement which includes at least one component which is selected from the compounds $3CaO*Al_2O_3$, $12CaO*7Al_2O_3$, $CaO*Al_2O_3$, $CaO*2Al_2O_3$, $CaO*6Al_2O_3$ and $4CaO*3Al_2O_3*SO_3$, and 15 to 80 wt % of a sulfate carrier, wherein the wt % is based on a weight of the fast-curing mineral binder mixture. The fast-curing mineral binder mixture can optionally include at least one alkaline component and/or at least one additive.

24 Claims, 7 Drawing Sheets

RAPID-HARDENING MINERAL BINDER MIXTURE

CROSS REFERENCE TO PRIOR APPLICATIONS

This application is a U.S. National Phase application under 35 U.S.C. § 371 of International Application No. PCT/EP2020/050860, filed on Jan. 15, 2020 and which claims benefit to European Patent Application No. 19152545.0, filed on Jan. 18, 2019. The International Application was published in German on Jul. 23, 2020 as WO 2020/148309 A1 under PCT Article 21(2).

FIELD

The present invention relates to a fast-curing mineral binder mixture and to its use.

BACKGROUND

Binders used in primary and secondary building materials are principally portland cements, calcium sulfates differing in the amounts of water of crystallization they contain, lime, high-alumina cements, or mixtures of these. Whereas portland cement-bound building materials are especially suitable in areas exposed to weathering, where there is a need for high alternating freeze/thaw resistance and also for high resistance to atmospheric effects, the construction products used principally in the interior of buildings are those comprising calcium sulfate and high-alumina cement, owing to their lack of weathering resistance. Products of these kinds, whose binders derive from mixtures of high-alumina cement, calcium sulfates, lime and/or portland cement, are nevertheless distinguished by particularly high development of early strength and also, in suitable formulations, by a high water-binding capacity and hence a high self-drying effect.

The construction industry, and especially the chemical construction products industry, use quick-hardening products based on a fast-curing mineral binder mixture. For the fast-curing mineral binder mixture, a variety of compositions are employed. Used in this context are at least one cement based on high-alumina cement, also called calcium aluminate cement with variable $CaO:Al_2O_3$ ratio, and/or calcium sulfoaluminate, optionally also in a mixture with calcium sulfate hydrate modifications such as $CaSO_4$, $CaSO_4 \times 0.5\ H_2O$ and/or $CaSO_4 \times 2\ H_2O$, and/or further hydraulically hardening, cement-based binders according to EN 197-1. These mineral binder mixtures may further comprise CaO or $Ca(OH)_2$.

These binder mixtures can be used advantageously for producing a building material mixture further comprising (as the skilled person is aware) regular fillers and lightweight fillers, setting retarders, setting accelerators, dispersible plastics powders, defoamers and/or air entrainers, plasticizers, stabilizers, water retention agents, and also additives influencing the rheology of the building material mixture, and also, optionally, further additives, as known to the skilled person.

In mineral hydraulic binder mixtures it is possible to employ setting accelerators and/or setting retarders by admixing them in the dry or else dissolved state, as individual components and also as mixtures of the individual components. As solidification and setting accelerators, individual components or mixtures of individual components in the form of alkali metal and/or alkaline earth metal salts well known to the skilled person are employed. This group also includes organic salt compounds such as carboxylic salts, hydroxycarboxylic salts, cyanates, etc.

Especially for quick-hardening binder mixtures comprising calcium aluminate in varying $CaO:Al_2O_3$ ratios, and also binder mixtures comprising calcium sulfoaluminate and/or mixtures thereof, the accelerator additives added are those comprising lithium salts such as lithium carbonate, lithium hydroxide, lithium sulfate, etc., and also mixtures thereof, optionally together with further accelerators or retarders, in order to provide the desired properties of the binder mixture, such as working time, hardening duration, solidification times, strength development, and rapid drying as a result, for example, of mineralogical water binding.

Because of the use of lithium salts for the production of batteries for portable electronics and vehicles, there is a constant increase in the demand for lithium salts for non-construction applications, meaning that prices and availabilities for the production of building materials are becoming increasingly critical.

SUMMARY

An aspect of the present invention is to provide an alternative to the existing lithium compounds used as an accelerator admixture, and the use thereof for quick-hardening binder mixtures.

In an embodiment, the present invention provides a fast-curing mineral binder mixture which includes a titanium (IV)-based accelerator, a cement comprising at least one component selected from the compounds $3CaO*Al_2O_3$, $12CaO*7Al_2O_3$, $CaO*Al_2O_3$, $CaO*2Al_2O_3$, $CaO*6Al_2O_3$ and $4CaO*3Al_2O_3*SO_3$, and 15 to 80 wt % of a sulfate carrier, wherein the wt % is based on a weight of the fast-curing mineral binder mixture. The fast-curing mineral binder mixture optionally includes at least one alkaline component and/or at least one additive.

BRIEF DESCRIPTION OF THE DRAWINGS

The present invention is described in greater detail below on the basis of embodiments and of the drawings in which.

DETAILED DESCRIPTION

The present invention provides a fast-curing mineral binder mixture comprising a titanium(IV)-based accelerator, cement comprising one or more components selected from the compounds $3CaO*Al_2O_3$, $12CaO*7Al_2O_3$, $CaO*Al_2O_3$, $CaO*2Al_2O_3$, $CaO*6Al_2O_3$ and/or $4CaO*3Al_2O_3*SO_3$, a sulfate carrier in a fraction of 5 to 80 wt %, for example, 15 to 70 wt %, for example, 25 to 50 wt %, optionally one or more than one alkaline component, and optionally one or more additives. The fast-curing mineral binder composition can, for example, use titanyl sulfate ($TiO(SO_4)$), titanium (IV) sulfate, titanium(IV) phosphate and/or titanium(IV) oxychloride ($TiOCl_2$), and also the hydrates and/or sulfuric acid adducts thereof, as titanium(IV)-based accelerators. $TiOCl_2$ is used in the form, for example, of $TiOCl_2HCl$ solution.

Surprisingly, the addition of a titanium(IV)-based accelerator such as e.g. titanyl sulfate at low dosages exhibits an accelerating effect which is comparable with that of lithium salts in amounts known to the skilled person. This is especially surprising as the literature has to date ascribed precisely the opposite technical effect to titanyl sulfate. WO 2017/155517 discloses, for example, the use of titanyl sulfate as a set retarder. Nowhere has there been any description of the simple replacement/substitution of lithium salts with titanyl sulfate.

The fast-curing mineral binder mixture can, for example, use titanyl sulfate ($Ti(SO_4)$) in a fraction of 0.01 to 6 wt %, for example, 0.1 to 3 wt %, for example, 0.2 to 0.8 wt %, and/or titanium(IV) oxychloride ($TiOCl_2$) in a fraction of 0.01 to 6 wt %, for example, 0.1 to 3 wt %, for example, 0.2 to 0.8 wt %, based in each case on the weight of the fast-curing mineral binder mixture.

The titanium(IV)-based accelerator can, for example, be admixed as a solid, as an aqueous-based suspension, as a solution, and/or absorbed and/or adsorbed on a carrier, to the fast-curing mineral binder mixture. The carriers can, for example, be selected from silicon dioxide ($SiO_2$), aluminum oxide ($Al_2O_3$) and/or titanium dioxide ($TiO_2$). Further solids or accelerators or retarders can, for example, be added. One particularly fast-curing mineral binder mixture is obtained if the titanium(IV)-based accelerator of the present invention is used in the fast-curing mineral binder mixture of the present invention as an aqueous solution or as a dispersion. This may be of advantage in the oil and gas sector, for example, in order to rapidly plug boreholes in situ, or in road building, particularly in tunnel construction, where a fast-curing mineral binder mixture is applied or sprayed onto the walls of a tunnel.

The cement in the fast-curing mineral binder mixture can, for example, be a high-alumina cement and/or a portland cement. A skilled person here will also understand that portland cement may also comprise the sulfate carrier.

The molar ratio of titanium(IV)-based accelerator to the compound CaO in the compounds (i.e., mmol of titanium (IV)-based accelerator:mol of compound CaO in the compounds) of the fast-curing mineral binder mixture is, for example, from 0.1 to 300, for example, 2 to 100, for example, 3 to 50.

Sulfate carriers used in the fast-curing mineral binder mixture can, for example, be calcium sulfate, magnesium sulfate, sodium sulfate, potassium sulfate, iron sulfate, manganese sulfate, cobalt sulfate, nickel sulfate and/or potassium peroxomonosulfate. Particular preference is given to using calcium sulfate and/or magnesium sulfate as sulfate carriers in the fast-curing mineral binder mixture. Calcium sulfate is used with very particular preference as sulfate carrier. A sulfate carrier here is any compound which makes $SO_4^{2-}$ ions available in an aqueous medium. A salt of sulfuric acid is, for example, a sulfate carrier.

Alkaline activator used in the fast-curing mineral binder mixture can, for example, comprise portland cement, alkali metal oxides, alkaline earth metal oxides, alkali metal hydroxides and/or alkaline earth metal hydroxides and mixtures thereof.

Additive used in the fast-curing mineral binder mixture comprises setting retarders, setting accelerators, dispersible plastics powders, defoamers, water repellents, air entrainers, plasticizers, stabilizers, water retention agents and/or additives influencing building material mixture rheology.

The fast-curing mineral binder mixture can, for example, comprise cement in a fraction of 5 to 80 wt %, titanium (IV)-based accelerator in a fraction of 0.001 to 15 wt %, sulfate carrier in a fraction of 5 to 80 wt %, alkaline component in a fraction of 0 to 10 wt %, and additive in a fraction of 0 to 15 wt %, where the wt % add up in each case to 100 wt %, and the wt % are based in each case on the fast-curing mineral binder mixture. The fast-curing mineral binder mixture can, for example, comprise cement in a fraction of 15 to 70 wt %, titanium(IV)-based accelerator in a fraction of 0.1 to 6 wt %, sulfate carrier in a fraction of 15 to 70 wt %, alkaline component in a fraction of 1 to 8 wt % and additive in a fraction of 1 to 9 wt %. The fast-curing mineral binder mixture can, for example, comprise cement in a fraction of 25 to 50 wt %, titanium(IV)-based accelerator in a fraction of 0.2 to 3 wt %, sulfate carrier in a fraction of 25 to 50 wt %, alkaline component in a fraction of 1.5 to 6 wt % and additive in a fraction of 2 to 7 wt %. The fast-curing mineral binder mixture can, for example, comprises titanium(IV)-based accelerator in a fraction of 0.3 to 1.0 wt %, alkaline component in a fraction of 2 to 3 wt % and additive in a fraction of 3 to 6 wt %.

The fast-curing mineral binder mixture can, for example, additionally comprise lithium salts. Experience has shown that approximately 3.5 times the amount of titanyl sulfate in comparison to lithium salts achieves good acceleration results. An aim of the present invention, however, is for the titanium(IV)-based accelerators of the present invention to replace and be used instead of the lithium salts customary to date. In a further embodiment, the fast-curing mineral binder mixture comprises no alkoxysilanes or polysiloxanes. There is no need for the use of alkoxysilanes or polysiloxanes which, on the basis of the alkoxy groups, are amenable to intermolecular polycondensation with formation of —Si—O—Si groups and which consequently raise the mechanical strength.

The present invention also relates to the use of titanyl sulfate ($TiO(SO_4)$), titanium(IV) sulfate, titanium(IV) phosphate and/or titanium(IV) oxychloride ($TiOCl_2$), including in the form of their hydrates and/or sulfuric acid adducts, as an accelerator for a fast-curing mineral binder mixture. The fast-curing mineral binder mixture can, for example, be used in a building material. The building material according to the present invention can, for example, comprise mortars, jointing mortars, renders, screeds, self-leveling screeds, prefabricated parts, wall-filling compound, floor-filling compound, paving stones, patio stones, building slabs, repair mortars, injection mortars, cementitious building adhesives such as tile adhesives, natural stone adhesives, EIFS adhesives, anchoring mortars, flexible mineral grouts and/or concretes.

With the fast-curing mineral binder mixture of the present invention, it is possible to formulate all rapidly hydraulically hardening and/or quick-drying, cement-bound building materials such as mortars, renders, screeds, self-leveling screeds, prefabricated components, paving stones and patio stones, construction slabs, repair mortars and injection mortars, cementitious construction adhesives such as tile adhesives, natural stone adhesives or EIFS adhesives, anchoring mortars and concretes. The fast-curing mineral binder mixture of the invention can, for example, be used for the production of, for example, mineral fast-curing construction adhesives.

The present invention also relates to a method for producing a workable building material, comprising the steps of providing the fast-curing mineral binder mixture (as described above) as a solid, mixing the fast-curing mineral binder mixture with regular fillers and/or lightweight fillers, to give a dry building material, and mixing the dry building material with water, to give a workable building material. Regular fillers and/or lightweight fillers in the sense of the present invention are, for example, sand, gravel, hollow spheres, glass fibers, synthetic fibers, natural fibers, organic fibers, inorganic fibers, polystyrene beads, expanded polystyrene, expanded volcanic rock and/or granulated pumice.

The present invention also relates to a method for producing a workable building material, comprising the steps of mixing titanyl sulfate ($TiO(SO_4)$), titanium(IV) sulfate, titanium(IV) phosphate and/or titanium(IV) oxychloride ($TiOCl_2$) with water, to give a first mixture, and mixing the first mixture with a binder mixture comprising:
cement comprising one or more components selected from the compounds $3CaO*Al_2O_3$, $12CaO*7Al_2O_3$, $CaO*Al_2O_3$, $CaO*2Al_2O_3$, $CaO*6Al_2O_3$ and/or $4CaO*3Al_2O_3*SO_3$,
a sulfate carrier,
regular fillers and/or lightweight fillers,
optionally one or more than one alkaline component, and
optionally one or more additives,
to give the workable building material.

The present invention also relates to a method for producing a workable building material, comprising the steps of mixing titanyl sulfate ($TiO(SO_4)$), titanium(IV) sulfate, titanium(IV) phosphate and/or titanium(IV) oxychloride ($TiOCl_2$) with water, to give a first mixture, mixing water with a binder mixture comprising:
cement comprising one or more components selected from the compounds $3CaO*Al_2O_3$, $12CaO*7Al_2O_3$, $CaO*Al_2O_3$, $CaO*2Al_2O_3$, $CaO*6Al_2O_3$ and/or $4CaO*3Al_2O_3*SO_3$,
a sulfate carrier,
regular fillers and/or lightweight fillers,
optionally at least one alkaline component, and
optionally at least one additive,
to give a second mixture, and mixing the first mixture with the second mixture, to give the workable building material.

The first mixture can, for example, be provided in a first line or spray nozzle under pressure. The second mixture can, for example, be provided in a second line or spray nozzle under pressure. The first mixture in the first line or spray nozzle and the second mixture in the second line or spray nozzle may then, for example, be merged in a third line or jointly sprayed in order to obtain the mixture of the first mixture with the second mixture as a workable building material. The workable building material can, for example, be applied thereafter. Application can, for example, take place simultaneously with or immediately after, for example, ≤20 seconds after, for example, ≤5 seconds after, the merging of the first mixture with the second mixture.

The workable building material can, for example, be used in tunnel construction or in a 3D concrete printer.

A quality of the fast-curing mineral binder mixture of the present invention is that penetration of a conical penetrometer (cone) after 3 hours is, for example, 0 mm, for example, 0 mm after 2 hours, for example, 0 mm after 1 hour, measured in each case by the Vicat cone method according to DIN EN 13279-2:2014-03. Penetration of a conical penetrometer (cone) after 5 min in this case is, for example, <10 mm, for example, <5 mm, measured by the Vicat cone method according to DIN EN 13279-2:2014-03.

A quality of the fast-curing mineral binder mixture of the present invention is that a tile with dimensions of 50 mm×50 mm×5 mm can still be laid 20 minutes after comb application, measured according to EN 1348:2007.

The present invention is illustrated below using a number of examples and representative drawings, without being confined to these. Further features essential to the present invention and advantages of the present invention are apparent here from the drawings and the description thereof.

The methods for measuring the properties described above are specified in the examples.

EXAMPLES

The following experimental mixtures were prepared. The procedure involves scattering in for 30 seconds in each case, followed by 45 seconds of mixing.

The high-alumina cement (calcium aluminate cement) used was Caro White from Almatis GmbH or LaJage Fondue CAC 40.

The sulfate carrier used was a calcium sulfate hemihydrate from Remondis SE & Co. KG.

The cement used was a portland cement from Spenner GmbH & Co. KG.

The filler used was a commercial quartz sand of type H 31 from Quarzwerke GmbH.

The dispersible plastics powder used was Vinnapas® 5010N from Wacker Chemie AG.

The cellulose ether used was the Culminal™ C 9133 grade from Ashland Industries Inc.

The lithium carbonate used was technical-grade lithium carbonate from Galaxy Lithium Ltd.

The inventive titanium(IV)-based accelerator used, illustratively, was titanyl sulfate dihydrate.

Example 1

|  | Initial mass (g) | V1A Mass % | V1B Mass % | V1cc Mass % |
| --- | --- | --- | --- | --- |
| High-alumina cement CAC 70 | 225.7 | 22.57 | 22.57 | 22.57 |
| Sulfate carrier | 152.6 | 15.26 | 15.26 | 15.26 |
| Cement to EN 197-1 | 30 | 3.00 | 3.00 | 3.00 |
| Filler | 591.7 | 59.17 | 59.17 | 59.17 |
| Lithium carbonate |  |  | 0.1 |  |
| Titanyl sulfate |  |  |  | 0.35 |

Example 2

|  | Initial mass (g) | V3-1 Mass % | V3-2 Mass % | V3-3 Mass % |
| --- | --- | --- | --- | --- |
| High-alumina cement CAC 70 | 203.1 | 20.31 | 20.31 | 20.31 |
| Sulfate carrier | 167.9 | 16.79 | 16.79 | 16.79 |
| Cement to EN 197-1 | 30 | 3 | 3 | 3 |
| Filler | 599 | 59.9 | 59.8 | 59.55 |
| Lithium carbonate |  |  | 0.1 |  |
| Titanyl sulfate |  |  |  | 0.35 |

Example 3

|  | Initial mass (g) | V4-1 Mass % | V4-2 Mass % | V4-3 Mass % |
|---|---|---|---|---|
| High-alumina cement CAC 70 | 203.1 | 20.31 | 20.31 | 20.31 |
| Sulfate carrier | 167.9 | 16.79 | 16.79 | 16.79 |
| Cement to EN 197-1 | 30 | 3 | 3 | 3 |
| Filler | 599 | 59.55 | 59.45 | 59.2 |
| Cellulose ether | 3.5 | 0.35 | 0.35 | 0.35 |
| Lithium carbonate |  |  | 0.1 |  |
| Titanyl sulfate |  |  |  | 0.35 |

Example 4

|  | Initial mass (g) | V5-1 Mass % | V5-2 Mass % | V5-3 Mass % |
|---|---|---|---|---|
| High-alumina cement CAC 70 | 203.1 | 20.31 | 20.31 | 20.31 |
| Sulfate carrier | 167.9 | 16.79 | 16.79 | 16.79 |
| Cement to EN 197-1 | 30 | 3 | 3 | 3 |
| Filler | 599 | 59.55 | 59.45 | 59.2 |
| Dispersible plastics powder | 40 | 4 | 4 | 4 |
| Cellulose ether | 3.5 | 0.35 | 0.35 | 0.35 |
| Lithium carbonate |  |  | 0.1 |  |
| Titanyl sulfate |  |  |  | 0.35 |

Example 5

|  | Initial mass (g) | V6-1 Mass % | V6-2 Mass % | V6-3 Mass % |
|---|---|---|---|---|
| High-alumina cement CAC 40 | 203.1 | 20.31 | 20.31 | 20.31 |
| Sulfate carrier | 167.9 | 16.79 | 16.79 | 16.79 |
| Cement to EN 197-1 | 30 | 3 | 3 | 3 |
| Filler | 599 | 59.55 | 59.45 | 59.2 |
| Lithium carbonate |  |  | 0.1 |  |
| Titanyl sulfate |  |  |  | 0.35 |

Example 6

|  | Initial mass (g) | V7-1 Mass % | V7-2 Mass % | V7-3 Mass % |
|---|---|---|---|---|
| High-alumina cement CAC 40 | 203.1 | 20.31 | 20.31 | 20.31 |
| Sulfate carrier | 167.9 | 16.79 | 16.79 | 16.79 |
| Cement to EN 197-1 | 30 | 3 | 3 | 3 |
| Filler | 599 | 59.55 | 59.45 | 59.2 |
| Dispersible plastics powder | 40 | 4 | 4 | 4 |
| Cellulose ether | 3.5 | 0.35 | 0.35 | 0.35 |
| Lithium carbonate |  |  | 0.1 |  |
| Titanyl sulfate |  |  |  | 0.35 |

The curing and evaluation of the experimental mixtures were determined using the VICAT method ("Vicat cone method") as described in more detail in DIN EN 13279-2: 2014-03.

The Vicat cone method is the standard method for all premixed gypsum renders which comprise additives and retarders. The Vicat cone method uses the depth of penetration of a conical penetrator (cone) into a gypsum/water paste over the course of hardening. This principle is used in order to determine the initial set-up time.

The apparatus used is as follows:
 a) Vicat device (see FIG. 1);
 b) conical penetrator (cone);
 c) glass plate: about 150 mm long and 150 mm wide;
 d) Vicat ring;
 e) a straight edge 140 mm in length;
 f) a chronometer; and
 g) a mixer and paddle.

Figure 1:
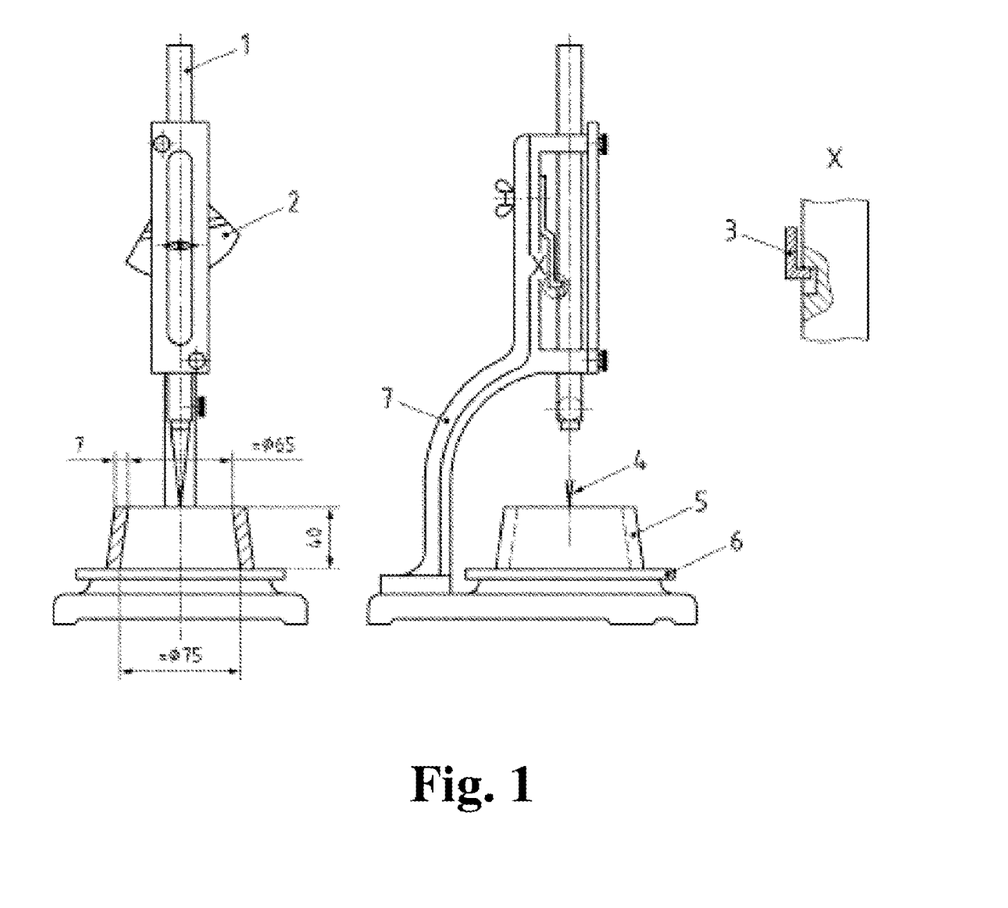
FIG. 1 shows a typical Vicat apparatus with a needle and release mechanism.

FIG. 1 shows a typical Vicat device with needle and release mechanism. The reference numbers here have the following meanings:
 1) Guide rail;
 2) Release mechanism;
 3) Spring plate;
 4) Conical penetrometer (cone);
 5) Vicat ring;
 6) Glass plate; and
 7) Pedestal.

The Vicat ring is placed onto the glass plate, with the larger opening in contact with the glass plate. The gypsum render is mixed with the ascertained amount of water. The time at which the gypsum is first added to the water is recorded (t0). An excess of gypsum is transferred to the ring. With a sawing motion, the excess material is removed with the straight edge held vertically. The cone is lowered onto the render surface with a spring plate of the release mechanism.

The guide rail is opened for testing with the release mechanism. The time between cone penetration ought not to be greater than 1/20 of the initial setting time. The cone is cleaned and dried between each penetration, and there ought to be at least 12 mm between each penetration mark. The time at which the depth of penetration has been reached, (22±2) mm above the glass plate, is recorded (t1).

The data determined here were as follows:

Example 1

|  | V1-A | V1-B | V1-Ca | V1-Cb | V1-Cc |
|---|---|---|---|---|---|
| Initial mass (g) | 305 g | 348.4 g | 341.13 g | 303.16 g | 301.24 g |
| Water | 62.9 g | 59.49 g | 59.49 | 50.0 g | 50.0 g |
| $Li_2CO_3$ | 0 g | 0.38 g | 0 g | 0 g | 0 g |
| $TiOSO_4$ | 0 g | 0 g | 0.4 g | 0.82 g | 1.2 g |
| w/f | 0.21 | 0.17 | 0.18 | 0.17 | 0.17 |

| Minutes | mm | °C. | mm | °C. | mm | °C. | mm | °C. | mm | °C. |
|---|---|---|---|---|---|---|---|---|---|---|
| 0  | 40 | 23.6 | 40 | 23.8  | 40 | 23.4 | 40 | 23.6 | 40 | 23.8 |
| 5  | 40 | 23.7 | 4  | 25.9  | 40 | 23.6 | 40 | 24.1 | 5  | 24.2 |
| 10 | 30 | 23.8 | 0  | 28.3  | 40 | 23.9 | 4  | 24.8 | 0  | 25.8 |
| 15 | 18 | 23.8 | 0  | 32.1  | 39 | 24.1 | 0  | 25.2 | 0  | 26.7 |
| 20 | 12 | 23.8 | 0  | 34.3  | 21 | 24.3 | 0  | 26.3 | 0  | 28.0 |
| 25 | 6  | 23.8 | 0  | 35.2  | 4  | 24.5 | 0  | 27.9 | 0  | 29.1 |
| 30 | 0  | 23.8 | 0  | 36.85 | 0  | 24.8 | 0  | 29.0 | 0  | 30.2 |
| 40 | 0  | 23.8 | 0  | 38.2  | 0  | 25.1 | 0  | 30.4 | 0  | 31.8 |
| 50 | 0  | 23.8 | 0  | —     | 0  | —    | 0  | —    | 0  | —    |

The starting formulation for the initial weighing was:

|  | Mol | Mass | Active content | Initial mass (g) | Mass % |
|---|---|---|---|---|---|
| High-alumina cement CAC 70 | 1 | 158 | 0.7 | 225.7 g | 22.57% |
| Sulfate carrier | 1 | 145 | 0.95 | 152.6 g | 15.26% |
| Cement to EN 197-1 |  |  |  | 30.0 g | 3.00% |
| Filler |  |  |  | 591.7 g | 59.17% |
|  |  |  |  | 1000 g |  |

Figure 2:
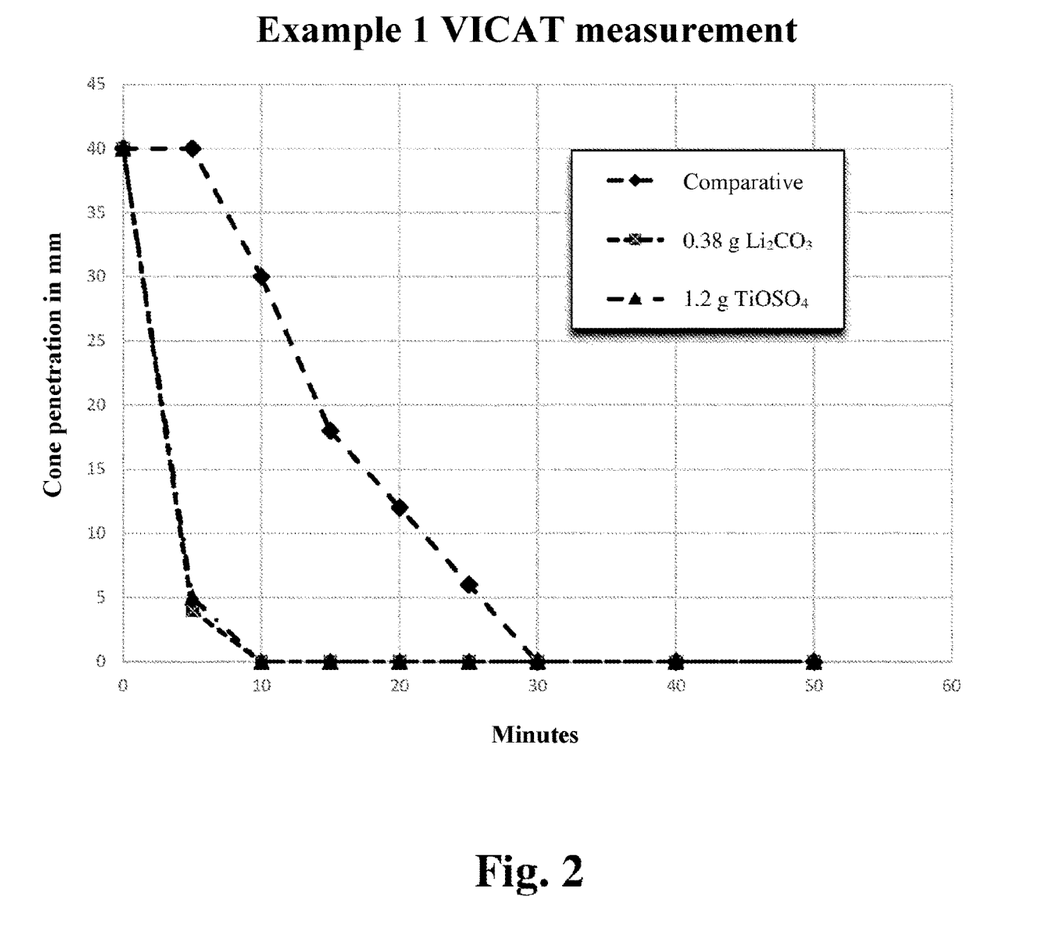
FIG. 2 shows a comparison of the Vicat measurement of Example 1 (A, B and Cc)
Figure 3:
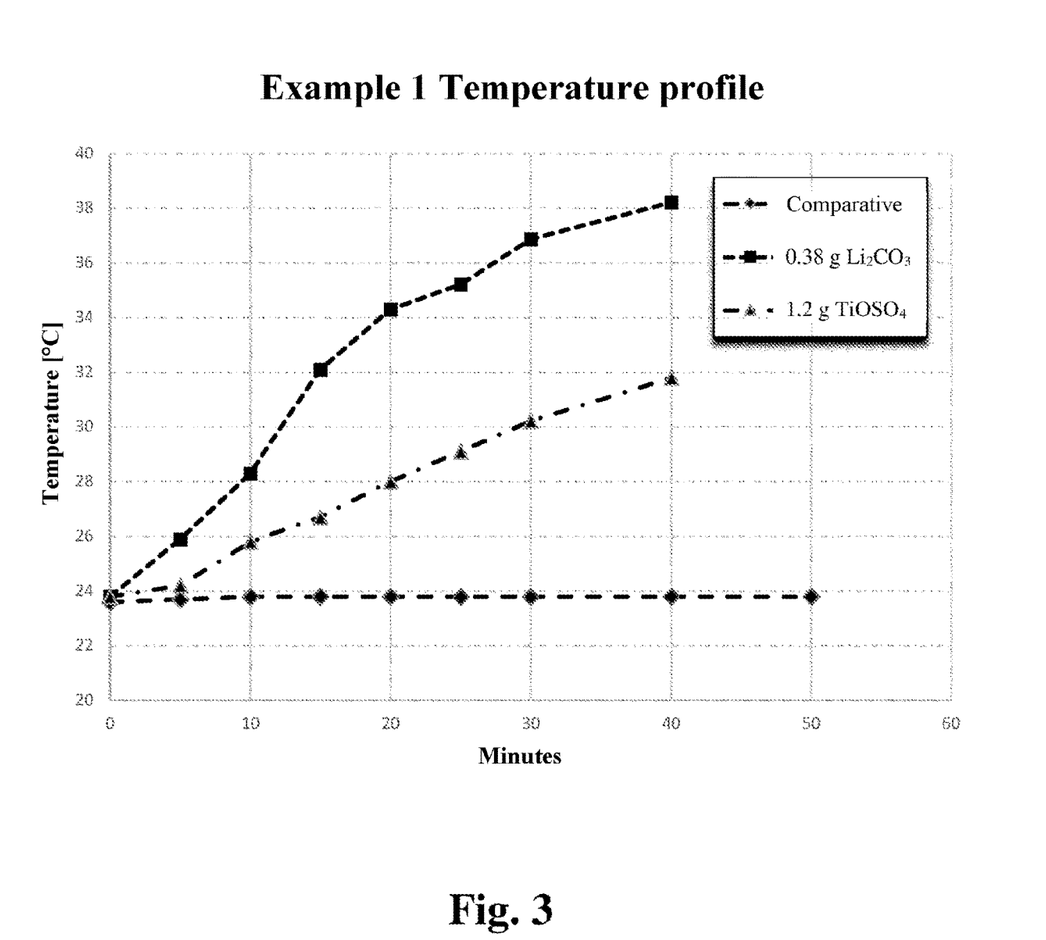
FIG. 3 shows a comparison of the temperature profile of Example 1 (A, B and Cc)

A comparison of Example 1 A, B and Cc is illustrated in FIGS. 2 and 3.

Example 2

|  | V2-A | V2-B | V2-C |
|---|---|---|---|
| Initial mass (g) | 301.42 g | 301.69 g | 301.24 g |
| Water | 50 g | 50 g | 50 g |
| $Li_2CO_3$ | 0 g | 0.38 g | 0 g |
| $TiOSO_4$ | 0 g | 0 g | 1.19 g |
| w/f | 0.17 | 0.17 | 0.17 |

| Minutes | mm | °C. | mm | °C. | mm | °C. |
|---|---|---|---|---|---|---|
| 0  | 40 | 21.3 | 40 | 22.2 | 40 | 22.6 |
| 5  | 40 | 22.2 | 12 | 23.9 | 15 | 23.5 |
| 10 | 28 | 22.7 | 0  | 28.9 | 0  | 24.0 |
| 15 | 16 | 22.8 | 0  | 32.2 | 0  | 24.4 |
| 20 | 8  | 22.9 | 0  | —    | 0  | 25.3 |
| 25 | 2  | 22.9 | 0  | —    | 0  | 26.1 |
| 30 | 0  | 22.9 | 0  | —    | 0  | —    |
| 40 | 0  | —    | 0  | —    | 0  | —    |
| 50 | 0  | —    | 0  | —    | 0  | —    |

The starting formulation for the initial weighing was:

|  | Mol | Mass | Active content | Initial mass (g) | Mass % |
|---|---|---|---|---|---|
| High-alumina cement CAC 70 | 1.1 | 158 | 0.7 | 248.3 g | 24.83% |
| Sulfate carrier | 0.9 | 145 | 0.95 | 137.4 g | 13.74% |
| Cement to EN 197-1 |  |  |  | 30.0 g | 3.00% |
| Filler |  |  |  | 584.3 g | 58.43% |
|  |  |  |  | 1000 g |  |

Figure 4:
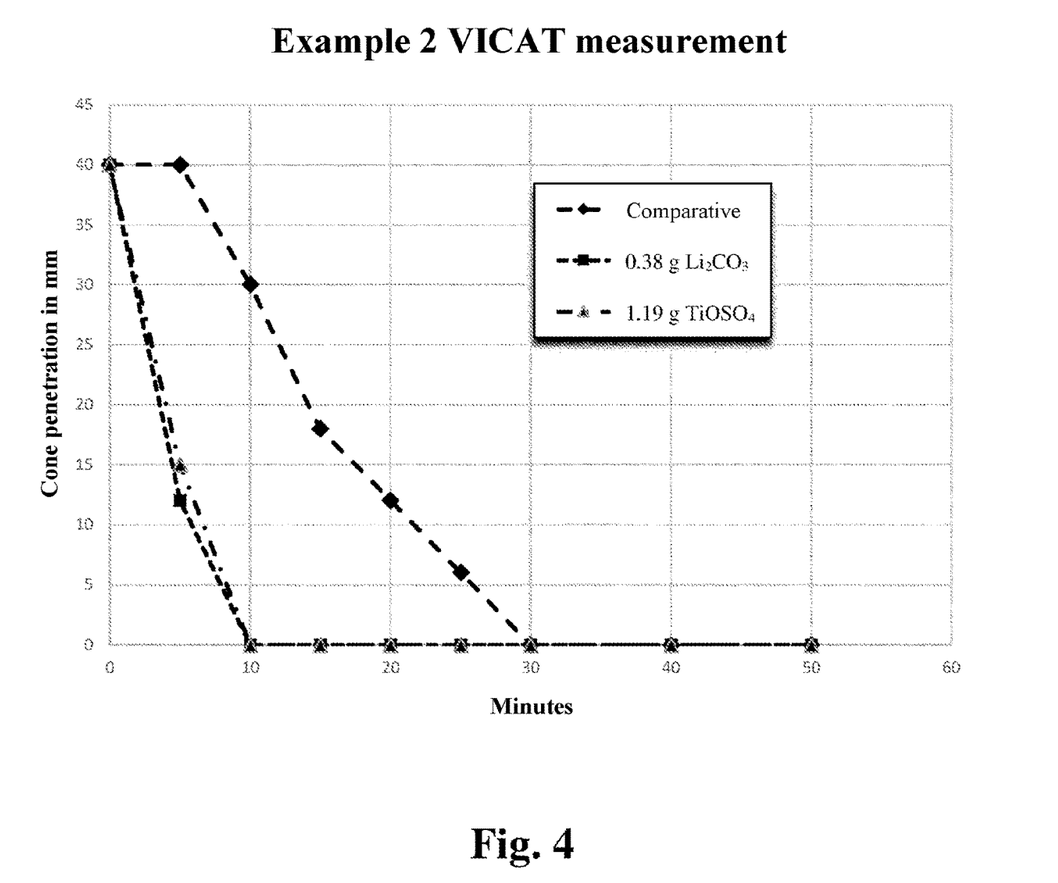
FIG. 4 shows a comparison of the Vicat measurement of Example 2 (A, B and C)
Figure 5:
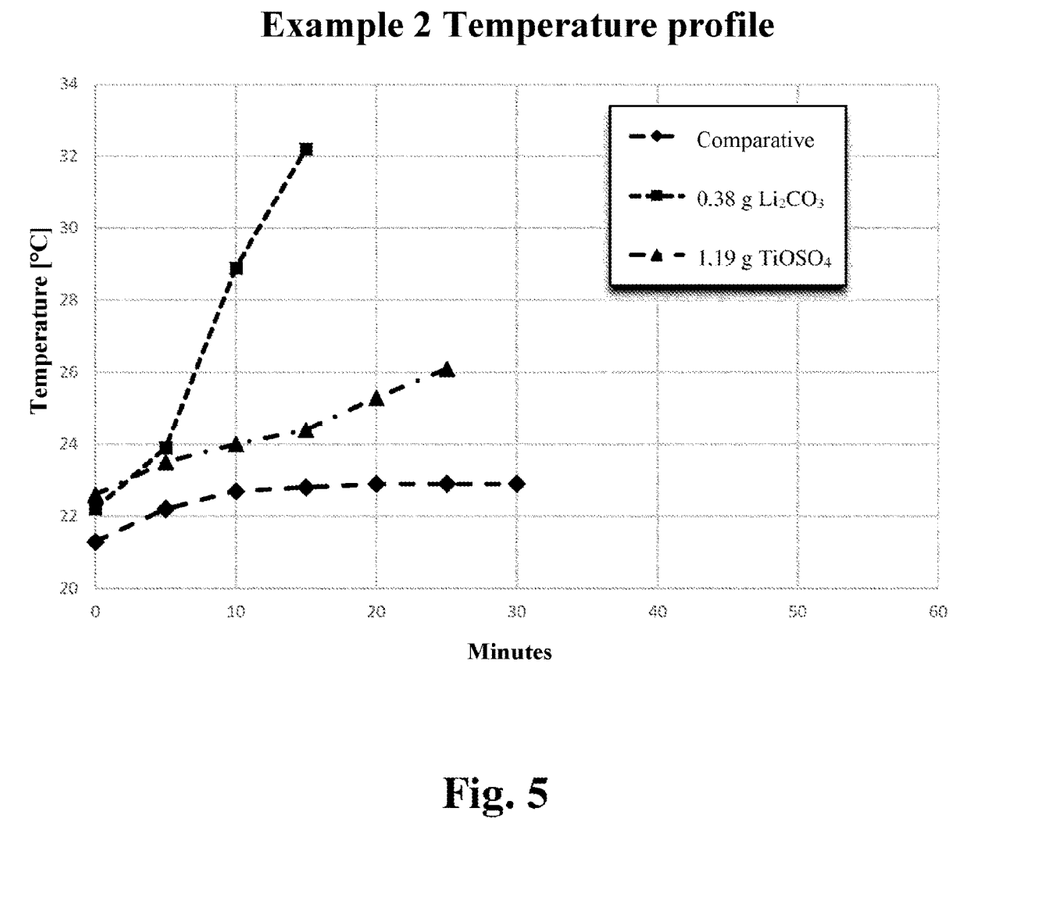
FIG. 5 shows a comparison of the temperature profile of Example 2 (A, B and C)

A comparison of Example 2 A, B and C is illustrated in FIGS. 4 and 5.

Example 3

|  | V3-A | V3-B | V3-C |
|---|---|---|---|
| Initial mass (g) | 300.5 g | 300.6 g | 301.6 g |
| Water | 50 g | 50 g | 50 g |
| $Li_2CO_3$ | 0 g | 0.38 g | 0 g |
| $TiOSO_4$ | 0 g | 0 g | 1.22 g |
| w/f | 0.17 | 0.17 | 0.17 |

| Minutes | mm | °C. | mm | °C. | mm | °C. |
|---|---|---|---|---|---|---|
| 0  | 40 | 22.8 | 40 | 22.6 | 40 | 23.6 |
| 5  | 40 | 23.5 | 22 | 24.3 | 10 | 24.6 |
| 10 | 40 | 23.7 | 0  | 28.7 | 0  | 25.4 |
| 15 | 18 | 23.7 | 0  | 31.4 | 0  | 26.1 |
| 20 | 9  | 23.7 | 0  | —    | 0  | —    |
| 25 | 4  | 23.6 | 0  | —    | 0  | —    |
| 30 | 0  | 23.6 | 0  | —    | 0  | —    |
| 40 | 0  | —    | 0  | —    | 0  | —    |
| 50 | 0  | —    | 0  | —    | 0  | —    |

The starting formulation for the initial weighing was:

|  | Mol | Mass | Active content | Initial mass (g) | Mass % |
|---|---|---|---|---|---|
| High-alumina cement CAC 70 | 0.9 | 158 | 0.7 | 203.1 g | 20.31% |
| Sulfate carrier | 1.1 | 145 | 0.95 | 167.9 g | 16.79% |
| Cement to EN 197-1 |  |  |  | 30.0 g | 3.00% |
| Filler |  |  |  | 599.0 g | 59.90% |
|  |  |  |  | 1000 g |  |

Figure 6:
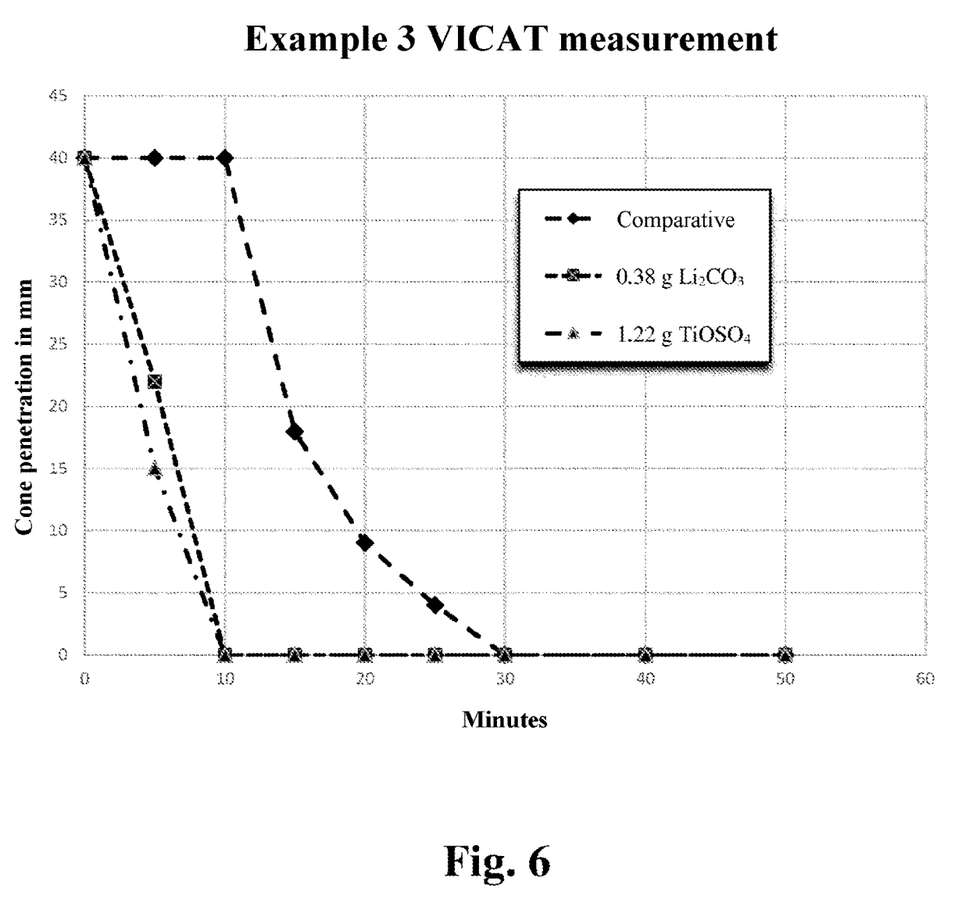
FIG. 6 shows a comparison of the Vicat measurement of Example 3 (A, B and C)
Figure 7:
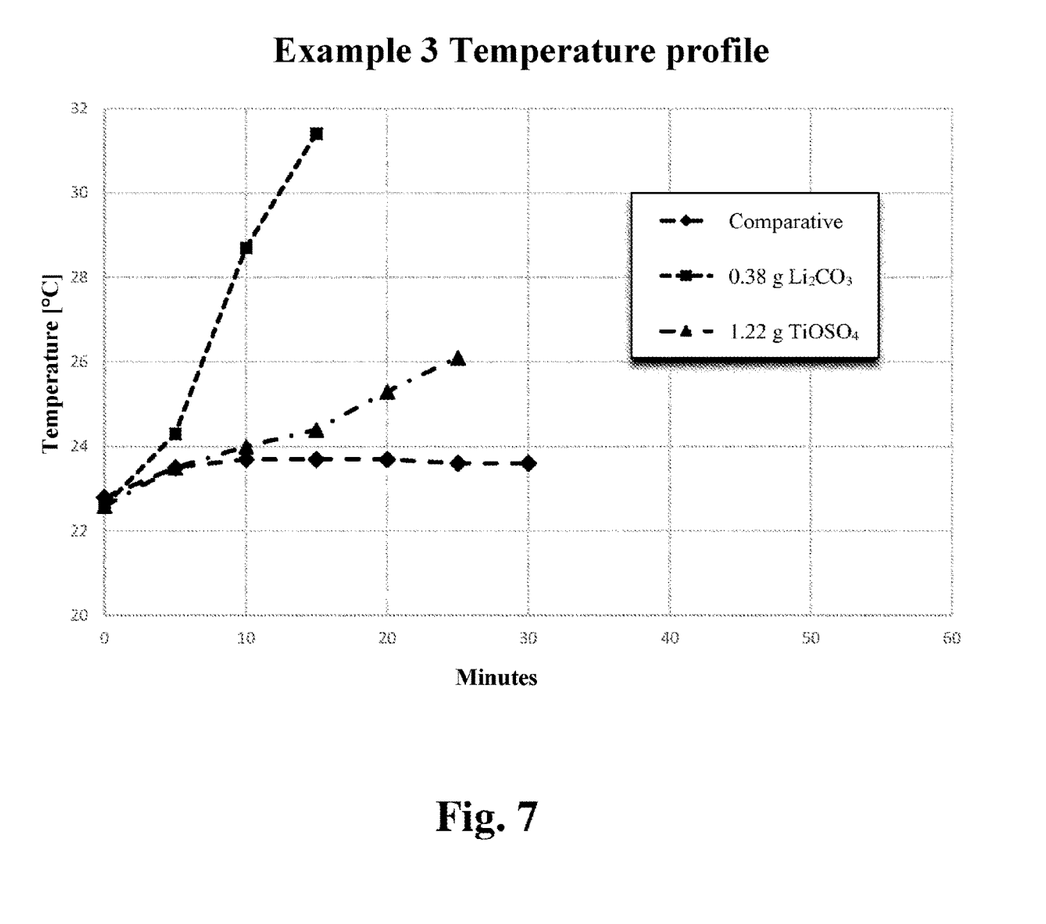
FIG. 7 shows a comparison of the temperature profile of Example 3 (A, B and C).

A comparison of Example 3 A, B and C is illustrated in FIGS. 6 and 7.

FIGS. 2 to 7 show clearly that the titanium(IV)-based accelerator of the present invention accelerates curing of the experimental mixture relative to an experimental mixture with no titanium(IV)-based accelerator. FIGS. 2 to 7 also show that the titanium(IV)-based accelerator of the present invention additionally achieves a similar cure time to known accelerators, and particularly $Li_2CO_3$.

The titanium(IV)-based accelerator of the present invention can also be used advantageously for producing, for example, mineral fast-curing construction adhesives. In order to demonstrate this, the adhesive tensile strengths of an example mixture for mineral construction adhesives according to Example 4 and Example 6 were determined. In each experiment, 5 tiles each with dimensions of 50×50×5 mm were laid immediately and 20 minutes after the comb application of the construction adhesive mixture in accordance with EN 1348:2007, and tested. EN 1348:2007 specifies a method for determining the adhesive tensile strength of cementitious mortars for ceramic tiles and slabs, and is valid for all cementitious mortars with and without additional components for the processing of ceramic tiles and slabs on walls and floors, both interior and exterior. The pull-out test takes place after 6 hours. Data obtained here were as follows:

Example 4-2 (V5-2)—0.1% $Li_2CO_3$

| Pull-out test |  | N | Area mm$^2$ | μPa |
|---|---|---|---|---|
| Immediate | 1 | 1250 | 2500 | 0.500 |
|  | 2 | 1070 | 2500 | 0.428 |
|  | 3 | 1070 | 2500 | 0.428 |
|  | 4 | 1030 | 2500 | 0.412 |
|  | 5 | 1080 | 2500 | 0.432 |
|  |  |  |  | 0.440 |
| 20 min. | 1 | Ridges fully cured. Laying not possible. | 2500 | 0.000 |
|  | 2 |  | 2500 | 0.000 |
|  | 3 |  | 2500 | 0.000 |
|  | 4 |  | 2500 | 0.000 |
|  | 5 |  | 2500 | 0.000 |
|  |  |  |  | 0.000 |

Example 4-3 (V5-3)—0.35% $TiO(SO_4)$

| Pull-out test |  | N | Area mm$^2$ | μPa |
|---|---|---|---|---|
| Immediate | 1 | 1430 | 2500 | 0.572 |
|  | 2 | 1340 | 2500 | 0.536 |
|  | 3 | 1320 | 2500 | 0.528 |
|  | 4 | 1560 | 2500 | 0.624 |
|  | 5 | 1540 | 2500 | 0.616 |
|  |  |  |  | 0.575 |
| 20 min. | 1 | 1010 | 2500 | 0.404 |
|  | 2 | 1000 | 2500 | 0.400 |
|  | 3 | 770 | 2500 | 0.308 |
|  | 4 | 970 | 2500 | 0.388 |
|  | 5 | 990 | 2500 | 0.396 |
|  |  |  |  | 0.379 |

Example 6-2 (V7-2)—0.1% $Li_2CO_3$

| Pull-out test |  | N | Area mm$^2$ | μPa |
|---|---|---|---|---|
| Immediate | 1 | 1120 | 2500 | 0.448 |
|  | 2 | 1020 | 2500 | 0.408 |
|  | 3 | 1010 | 2500 | 0.404 |
|  | 4 | 1110 | 2500 | 0.444 |
|  | 5 | 1130 | 2500 | 0.452 |
|  |  |  |  | 0.431 |
| 20 min. | 1 | Ridges fully cured. Laying not possible. | 2500 | 0.000 |
|  | 2 |  | 2500 | 0.000 |
|  | 3 |  | 2500 | 0.000 |
|  | 4 |  | 2500 | 0.000 |
|  | 5 |  | 2500 | 0.000 |
|  |  |  |  | 0.000 |

Example 6-3 (V7-3)—0.35% $TiO(SO_4)$

| Pull-out test |  | N | Area mm$^2$ | μPa |
|---|---|---|---|---|
| Immediate | 1 | 740 | 2500 | 0.296 |
|  | 2 | 890 | 2500 | 0.356 |
|  | 3 | 870 | 2500 | 0.348 |
|  | 4 | 930 | 2500 | 0.372 |
|  | 5 | 860 | 2500 | 0.344 |
|  |  |  |  | 0.343 |
| 20 min. | 1 | 660 | 2500 | 0.264 |
|  | 2 | 600 | 2500 | 0.240 |
|  | 3 | 570 | 2500 | 0.228 |
|  | 4 | 520 | 2500 | 0.208 |
|  | 5 | 720 | 2500 | 0.288 |
|  |  |  |  | 0.246 |

These experiments demonstrate that the titanium(IV)-based accelerator of the present invention exhibits significant advantages over the prior art containing lithium carbonate. Examples 4-2 and 6-2 demonstrate that the laying of tiles is completely impossible 20 minutes after comb application. Conversely, Examples 4-3 and 6-3 demonstrate that the laying of tiles is still possible 20 minutes after comb application when using fast-curing construction adhesives containing the titanium(IV)-based accelerator of the present invention. The fast-curing mineral binder mixture can therefore, for example, have the quality which allows the laying of a tile with dimensions of 50 mm×50 mm×5 mm even 20 minutes after comb application (measured according to EN 1348:2007). Fast-curing construction adhesives comprising the titanium(IV)-based accelerator of the present invention therefore have the unusual but desired quality of curing rapidly yet curing slowly enough to allow working (such as the laying of tiles, for example) after comb application. This allows time for improved working and gives rise to fewer wastes without control additives.

The expression "comprising" in this description and in the claims, and also variations thereof, means that the specified features, steps, components and/or numbers are included/comprised. "Comprising" should not be interpreted to mean that other features, steps, components and/or numbers are excluded.

The present invention is not confined to the embodiments described in the description; reference is expressly made also to the appended claims, which are part of this description.

The invention claimed is:

1. A fast-curing mineral binder mixture comprising:
a titanium(IV)-based accelerator;
a cement comprising at least one component selected from the compounds $3CaO*Al_2O_3$, $12CaO*7Al_2O_3$, $CaO*Al_2O_3$, $CaO*2Al_2O_3$, $CaO*6Al_2O_3$ and $4CaO*3Al_2O_3*SO_3$; and
15 to 80 wt % of a sulfate carrier,
wherein,
the wt % is based on a weight of the fast-curing mineral binder mixture.

2. The fast-curing mineral binder mixture as recited in claim 1, further comprising:
at least one alkaline component; and
at least one additive.

3. The fast-curing mineral binder mixture as recited in claim 2, wherein the at least one alkaline component is at least one of a portland cement, an alkali metal oxide, an alkaline earth metal oxide, an alkali metal hydroxide, an alkaline earth metal hydroxide, and mixtures thereof.

4. The fast-curing mineral binder mixture as recited in claim 2, wherein the at least one additive is at least one of a retarder, a setting accelerator, a dispersible plastics powder, a defoamer, a water repellent, an air entrainer, a plasticizer, a stabilizer, a water retention agent and an additive which influences a building material mixture rheology.

5. The fast-curing mineral binder mixture as recited in claim 2, wherein the mineral binder mixture comprises:
5 to 80 wt % of the cement;
0.001 to 15 wt % of the titanium(IV)-based accelerator;
15 to 80 wt % of the sulfate carrier;
0 to 10 wt % of the at least one alkaline component; and
0 to 15 wt % of the at least one additive,
wherein,
the wt % s add up in each case to 100 wt %, and
the wt % s are based in each case on the weight of the fast-curing mineral binder mixture.

6. The fast-curing mineral binder mixture as recited in claim 5, wherein the mineral binder mixture comprises:
25 to 50 wt % of the cement;
0.2 to 3 wt % of the titanium(IV)-based accelerator;
25 to 50 wt % of the sulfate carrier;
2 to 3 wt % of the at least one alkaline component; and
3 to 6 wt % of the at least one additive,
wherein,
the wt % s add up in each case to 100 wt %, and
the wt % s are based in each case on the weight of the fast-curing mineral binder mixture.

7. The fast-curing mineral binder mixture as recited in claim 1, wherein the titanium(IV)-based accelerator comprises at least one of titanyl sulfate ($TiO(SO_4)$), titanium(IV) sulfate, titanium(IV) phosphate and titanium(IV) oxychloride ($TiOCl_2$).

8. The fast-curing mineral binder mixture as recited in claim 7, wherein the titanium(IV)-based accelerator comprises at least one of,
0.01 to 6 wt % of titanyl sulfate ($TiO(SO_4)$), and
0.01 to 6 wt % of titanium(IV) oxychloride ($TiOCl_2$),
wherein, the wt % s are based in each case on the weight of the fast-curing mineral binder mixture.

9. The fast-curing mineral binder mixture as recited in claim 1, wherein the titanium(IV)-based accelerator is admixed as at least one of,
a solid,
an aqueous-based suspension,
a solution, and
absorbed on a carrier,
to the fast-curing mineral binder mixture.

10. The fast-curing mineral binder mixture as recited in claim 1, wherein the cement is at least one of a high-alumina cement and a portland cement.

11. The fast-curing mineral binder mixture as recited in claim 1, wherein a molar ratio of the titanium(IV)-based accelerator to CaO in the compounds (mmol of the titanium (IV)-based accelerator: mol of CaO in the compounds) is from 0.1 to 300.

12. The fast-curing mineral binder mixture as recited in claim 1, wherein the sulfate carrier is at least one of calcium sulfate, magnesium sulfate, sodium sulfate, potassium sulfate, iron sulfate, manganese sulfate, cobalt sulfate, nickel sulfate and potassium peroxomonosulfate.

13. The fast-curing mineral binder mixture as recited in claim 1, wherein the fast-curing mineral binder mixture further comprises lithium salts.

14. A method of using at least one of titanyl sulfate ($TiO(SO_4)$), titanium(IV) sulfate, titanium(IV) phosphate and titanium(IV) oxychloride ($TiOCl_2$) as an accelerator for the fast-curing mineral binder mixture as recited in claim 1, the method comprising:
providing at least one of titanyl sulfate ($TiO(SO_4)$), titanium(IV) sulfate, titanium(IV) phosphate and titanium(IV) oxychloride ($TiOCl_2$); and
using the at least one of titanyl sulfate ($TiO(SO_4)$), titanium(IV) sulfate, titanium(IV) phosphate and titanium(IV) oxychloride ($TiOCl_2$) as the accelerator for the fast-curing mineral binder mixture as recited in claim 1.

15. A method of using the fast-curing mineral binder mixture as recited in claim 1 in a building material, the method comprising:
providing the fast-curing mineral binder mixture as recited in claim 1;
providing the building material; and
using the fast-curing mineral binder mixture as recited in claim 1 in the building material.

16. The method as recited in claim 15, wherein the building material comprises at least one of a mortar, a jointing mortar, a render, a screed, a self-leveling screed, a prefabricated part, a wall-filling compound, a floor-filling compound, a paving stone, a patio stone, a building slab, a repair mortar, an injection mortar, and a cementitious building adhesive.

17. A method for producing a workable building material, the method comprising:
providing the fast-curing mineral binder mixture as recited in claim 1 as a solid;
mixing the fast-curing mineral binder mixture with at least one of a regular filler and a lightweight filler so as to provide a dry building material; and mixing the dry building material with water so as to provide the workable building material.

18. A method of using the workable building material as recited in claim 17 in a tunnel construction or in a 3D concrete printer, the method comprising:
providing the workable building material as recited in claim 17; and
using the workable building material in the tunnel construction or in the 3D concrete printer.

19. A method for producing a workable building material, the method comprising:
mixing at least one of titanyl sulfate ($TiO(SO_4)$), titanium (IV) sulfate, titanium(IV) phosphate and titanium(IV) oxychloride ($TiOCl_2$) with water so as to provide a first mixture; and
mixing the first mixture with a binder mixture comprising,
a cement comprising at least one component selected from the compounds $3CaO*Al_2O_3$, $12CaO*7Al_2O_3$, $CaO*Al_2O_3$, $CaO*2Al_2O_3$, $CaO*6Al_2O_3$ and/or $4CaO*3Al_2O_3*SO_3$,
15 to 80 wt % of a sulfate carrier, and
at least one of a regular filler and a lightweight filler, wherein the wt % is based on a weight of the binder mixture,
so as to provide the workable building material.

20. The method as recited in claim 19, wherein the binder mixture further comprises:
at least one alkaline component; and
at least one additive.

21. A method of using the workable building material as recited in claim 19 in a tunnel construction or in a 3D concrete printer, the method comprising:
providing the workable building material as recited in claim 19; and
using the workable building material in the tunnel construction or in the 3D concrete printer.

22. A method for producing a workable building material, the method comprising:
mixing at least one of titanyl sulfate ($TiO(SO_4)$), titanium (IV) sulfate, titanium(IV) phosphate and titanium(IV) oxychloride ($TiOCl_2$) with water so as to provide a first mixture;
mixing water with a binder mixture comprising,
a cement comprising at least one component selected from the compounds $3CaO*Al_2O_3$, $12CaO*7Al_2O_3$, $CaO*Al_2O_3$, $CaO*2Al_2O_3$, $CaO*6Al_2O_3$ and/or $4CaO*3Al_2O_3*SO_3$,
15 to 80 wt % of a sulfate carrier, and
at least one of a regular filler and a lightweight filler, so as to provide a second mixture,
wherein the wt % is based on a weight of the binder mixture; and
mixing the first mixture with the second mixture so as to provide the workable building material.

23. The method as recited in claim 22, wherein the binder mixture further comprises:
at least one alkaline component; and
at least one additive.

24. A method of using the workable material as recited in claim 22 in a tunnel construction or in a 3D concrete printer, the method comprising:
providing the workable building material as recited in claim 22; and
using the workable building material in a tunnel construction or in a 3D concrete printer.

* * * * *